F. A. ROSS.
TRANSMISSION DRIVE FOR SPEEDOMETERS.
APPLICATION FILED MAY 1, 1914.

1,205,027.

Patented Nov. 14, 1916.

Witnesses:

Inventor:
Frank A. Ross
by Burton & Burton
his attys.

UNITED STATES PATENT OFFICE.

FRANK A. ROSS, OF EVANSTON, ILLINOIS, ASSIGNOR TO STEWART-WARNER SPEEDOMETER CORPORATION, OF CHICAGO, ILLINOIS, A CORPORATION OF VIRGINIA.

TRANSMISSION-DRIVE FOR SPEEDOMETERS.

1,205,027.

Specification of Letters Patent.

Patented Nov. 14, 1916.

Application filed May 1, 1914. Serial No. 835,599.

*To all whom it may concern:*

Be it known that I, FRANK A. ROSS, a citizen of the United States, residing at Evanston, in the county of Cook and State of Illinois, have invented new and useful Improvements in Transmission-Drives for Speedometers, of which the following is a specification, reference being had to the accompanying drawings, forming a part thereof.

The purpose of this invention is to provide improved means for connecting a speedometer to the road wheels of an automobile by way of the automobile transmission.

It consists of the features and elements shown and described as set out in the claim.

Figure 1:
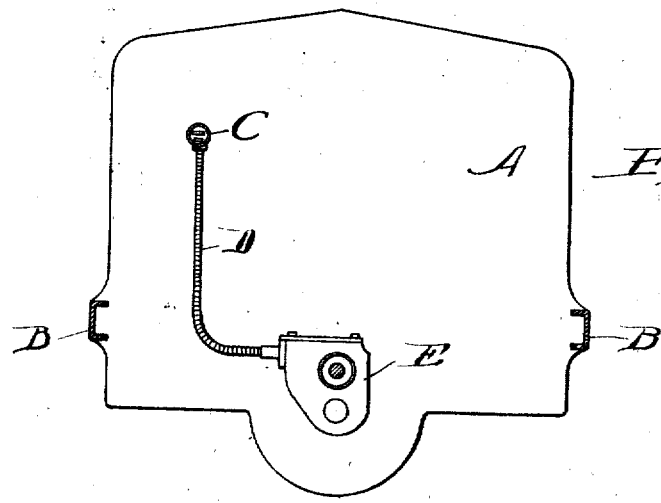
Figure 2:
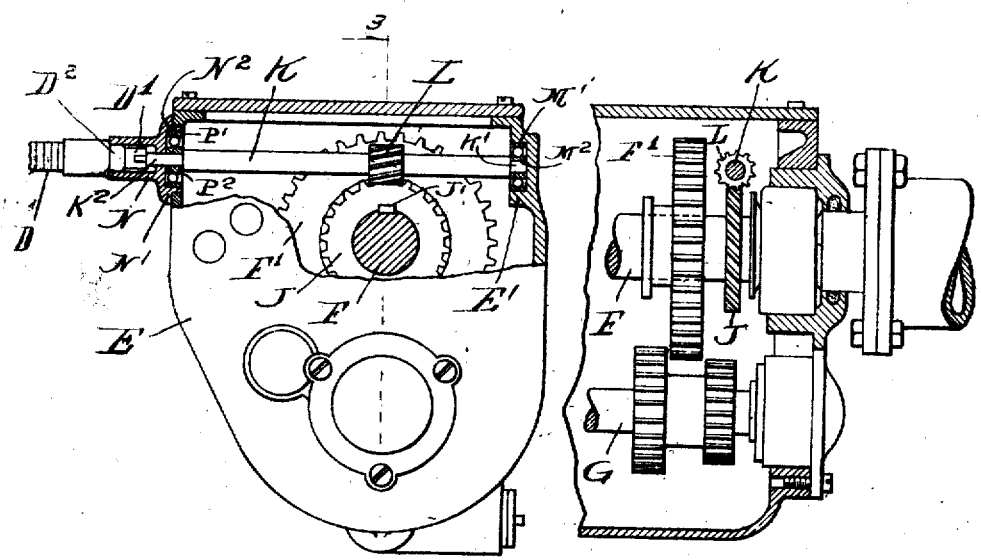
Figure 3:
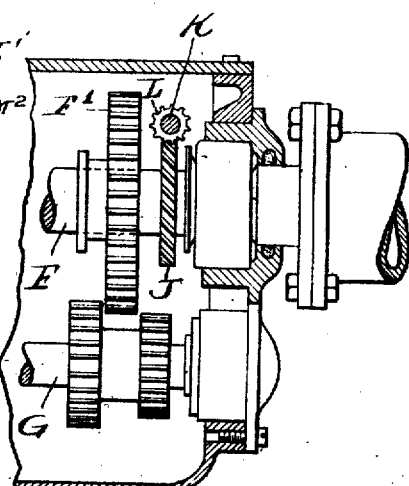

In the drawings:—Figure 1 is a diagrammatic view indicating in transverse elevation the relative positions of the speedometer and the transmission to which it is connected. Fig. 2 is an elevation of the transmission shown in Fig. 1 with parts broken away to reveal the speedometer drive gearing. Fig. 3 is a detail section taken as indicated at line 3—3 on Fig. 2.

In Fig. 1, A, indicates conventionally the dash-board of an automobile, the side frame members being shown in section at B, B. C, represents a speedometer mounted on the dash-board and provided with a flexible or jointed drive shaft, D, which extends into the housing, E, of the automobile transmission. The transmission which is more fully represented in Figs. 2 and 3 is of the usual type comprising a main shaft, F, and a side shaft, G, the shaft, F, being at all times positively connected with the driving wheels of the vehicle so that its speed of rotation bears a constant ratio to the speed of such wheels. Variations in speed ratio between the engine and the road wheels is obtained when desired by transmitting the power from the engine to gears on the side shaft, G, and through other gears on said shaft to a gear on the shaft, F, as for example, the gear, F¹; while the so-called direct drive is obtained by clutching the engine shaft directly to the shaft, F, by means not shown in the drawings. Such mechanisms are old in the art and are well understood.

The present invention consists in providing the shaft, F, with a special gear, J, shown as a spiral gear, and in fitting into the transmission housing, E, a small shaft, K, carrying a second spiral gear, L, positioned and formed to mesh with the gear, J. The gear, J, being keyed at J¹, to the shaft, F, will at all times transmit the rotation of said shaft to the shaft, K, and thence to the speedometer, C, through the jointed shaft, D, which is directly coupled to the shaft, K, as shown at D¹, in Fig. 2.

Further features of the invention consist in the fittings which are provided for mounting the shaft, K, in the housing, E. Preferably, the housing is cast with an annular boss, E¹, into which is forced the outer ball race, M¹, of an annular ball bearing, while the reduced end, K¹, of the shaft, K, is then driven into the inner member, M², of the ball race. The gear, L, being either formed integrally with the shaft, K, or secured rigidly to it is thus positioned with respect to the gear, J. At the opposite end of the shaft, K, the housing is apertured and a cap in the form of a flanged sleeve, N, is fitted into the aperture with its flange, N¹, abutting the outer wall of the casing, E. Within the inner end of the sleeve, N, the outer race, P¹, of an annular ball bearing is secured by driving fit while its inner race, P², is driven on to the end of the shaft, K. This end of the shaft extends at K², toward the other end of the sleeve, N, where it is coupled with the standard coupling, D¹, of the connecting shaft, D. It will be noted that since the gear, L, must be rigid with the shaft, K, when the latter is inserted into the housing, E, the opening which is closed by the flanged sleeve, N, will be made large enough to admit the gear, L, as well as the shaft, K.

With the parts assembled as above described, connection between the speedometer, C, and the road wheels of the vehicle is effected in the simplest possible manner, since the transmission housing, E, is generally located almost directly below the dash-board or just slightly rearward of it.

I claim:—

In an automobile, in combination with a transmission comprising a housing and a shaft inclosed thereby having a fixed speed ratio with respect to the road wheels of the vehicle, a gear on said shaft within the housing, a small shaft and a gear fixed thereon in position to mesh with the firstmentioned gear, a journal bearing for one end of said small shaft carried by one wall of the housing, the opposite wall having an aperture large enough to admit the gear on the small shaft, a fitting formed to close said aperture and carrying a second bearing for said shaft, said fitting terminating in a sleeve, a jointed shaft operatively connected with said small shaft outside the casing, and a tubular casing for said jointed shaft dimensioned at the end to fit said sleeve for connection therewith.

In testimony whereof, I have hereunto set my hand, at Chicago, Illinois, this 25th day of April, 1914.

FRANK A. ROSS.

Witnesses:
V. M. LLONA,
R. H. WALPOLE.